(12) United States Patent
Bortz

(10) Patent No.: US 7,785,413 B2
(45) Date of Patent: Aug. 31, 2010

(54) LACQUER THINNER

(76) Inventor: Steven H. Bortz, 6043 Tampa Ave., Tarzana, CA (US) 91356

( * ) Notice: Subject to any disclaimer, the term of this patent is extended or adjusted under 35 U.S.C. 154(b) by 1075 days.

(21) Appl. No.: 11/450,726

(22) Filed: Jun. 9, 2006

(65) Prior Publication Data
US 2006/0281844 A1  Dec. 14, 2006

Related U.S. Application Data

(60) Provisional application No. 60/690,382, filed on Jun. 10, 2005.

(51) Int. Cl.
*C09D 7/00* (2006.01)
(52) U.S. Cl. ..................................................... 106/311
(58) Field of Classification Search .................. 106/311
See application file for complete search history.

(56) References Cited

U.S. PATENT DOCUMENTS 3,192,061 A * 6/1965 Wilson et al. ............... 106/252
5,340,495 A * 8/1994 Mulcahy et al. .............. 134/32
6,017,862 A   1/2000 Doyel et al.
6,720,366 B1 * 4/2004 Torbus et al. ............... 523/142
2004/0063042 A1  4/2004 Egbe

FOREIGN PATENT DOCUMENTS

| | | |
|---|---|---|
| JP | 15114540 | 4/2003 |
| KR | 10-2000-63944 | 11/2000 |
| KR | 10-2004-36038 | 4/2004 |

* cited by examiner

*Primary Examiner*—David M Brunsman
(74) *Attorney, Agent, or Firm*—Kenneth L. Green

(57) ABSTRACT

A lacquer or other coating thinner having a low volatile organic compound (VOC) rating which permits its use for cleaning and thinning in government regulated areas. The thinner has an acetone, methyl acetate or tertiary butyl acetate or mixture as a base. It has various non-hazardous ingredients which include a soy oil material, a dibasic ester and a glycol and carbonate ingredient such as tetrahydrofurfuryl alcohol.

5 Claims, No Drawings

LACQUER THINNER

CROSS REFERENCE TO RELATED APPLICATIONS

The present application claims the benefit of U.S. Provisional Application Ser. No. 60/690,382, filed Jun. 10, 2005, which application is incorporated in it's entirety herein by reference.

BACKGROUND OF THE INVENTION

Many presently used thinners for lacquers and other coatings contain hazardous ingredients such as methyl ethyl ketone, isopropyl alcohol, methanol, mak, butyl cellusolve, petroleum naptha, and toluene. While such thinners perform adequately, their use of hazardous ingredients is a major disadvantage and they are prohibited in government regulated areas. While acetone alone can be used as a thinner, it is too volatile for many coatings when used as the sole thinner. In hot areas, if an acetone thinned coating is sprayed onto a surface, it can partially dry before the spray hits the material being coated. Thus, a less volatile thinner is needed.

BRIEF SUMMARY OF THE INVENTION

The thinner and cleaner of the present invention has a 0-25 grams per liter volatile organic compound (VOC) rating which permits its use for cleaning and thinning in government regulated areas. It performs equally to the above-listed hazardous thinners. The thinner of the present invention is used to produce solvent born coatings as well as for cleaning paint equipment. The thinner used bio-based chemicals combined with acetone. The bio-based portion uses chemicals that are not listed in material Safety Data Sheets section Sara III. VOC regulations are spreading across the country and the world causing an increased need for a low VOC reducer and cleaners. Coatings must use a reducer with a VOC which is the same or lower than the material which is being thinned.

DETAILED DESCRIPTION OF THE INVENTION

The South Coast Air Quality Management District has government's most stringent regulations in the United States. This regulatory body with Method 24 show the thinner of the present invention at 9½ grams per liter VOC. OSHA finds no hazardous ingredients other than acetone in this new thinner formulation. The thinner has the ability to reduce all coatings that use conventional high VOC thinners. This group would mostly include, but not be limited to, lacquer (solvent borne), oil based enamels, solvent based stains, solvent based water proofings, nail polish (solvent borne), solvent borne varnishes, and oil based urethanes.

The thinner of the present invention contains the following components:

1. A base solvent comprising 80-90% by weight selected from the group consisting essentially of acetone, methyl acetate, and tertiary butyl acetate, and mixtures thereof.
2. A methyl soy ester material comprising 1-10% by weight.
3. A dibasic ester comprising 1-10% by weight.
4. 1-3% by weight of a non-hazardous material selected from the group consisting of glycols and carbonates.

A preferred thinner utilizes a soy based material sold under the trademark SG5000X by Soy Technologies, LLC of Nicholasville, Ky. 40356. This soy based ester is a combination of soybean methyl esters dibasic esters and triethanolamine. The soy based methyl ester is a mixture of hexadecanoic acid, octadecanoic acid, 9-octadecenoic acid (Z)-, 9, 12-Octadecadienoic acid (Z,Z)- and 9. 12,15-Octadecatrienoic acid (9Z. 12Z. 15Z). The dibasic ester is a mixture of dimethyl glutarate, dimethyl adipate and dimethyl succinate.

The dibasic ester is preferably selected from the group consisting of dimethyl gluturate, dimethyl adipate, dimethyl succinate, and mixtures thereof.

A preferred non-hazardous material selected of glycols and carbonates is tetrahydrofurfuryl alcohol (THFA).

The result is a thinner which is not only useful in reducing or thinning and lacquers and other oil based coatings, but is also useful for cleaning. When used for cleaning, the solution leaves a barrier which prevents rust on metal and extends the life of a natural bristle or lamb's wool roller. It is at the same time complying with all government air regulations and is very friendly to the environment.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A thinner for solvent borne lacquer and coatings with a low volatile organic compounds (VOC) rating comprising:
   a carrier solvent comprising 80 to 90% by weight selected from the group consisting essentially of acetone, methyl acetate, and tertiary butyl acetate;
   a methyl soy ester material comprising 1 to 10% by weight; and
   a dibasic ester comprising 1 to 10% by weight.

2. The thinner for solvent borne lacquer and coatings of claim 1 wherein the carrier solvent is acetone.

3. The thinner for solvent borne lacquer and coatings of claim 1 wherein the thinner, in addition to the carrier solvent, is a combination of soybean methyl esters, dibasic esters and triethanolamine.

4. The thinner for solvent borne lacquer and coatings of claim 1 wherein the dibasic ester is selected from the group consisting of dimethyl gluturate, dimethyl adipate, dimethyl succinate, and mixtures thereof.

5. A thinner for lacquer and coatings with a low volatile organic compounds (VOC) rating comprising:
   a carrier solvent comprising 80 to 90% by weight of acetone;
   a methyl soy ester material comprising 1 to 10% by weight;
   a dibasic ester comprising 1 to 10% by weight comprising a mixture of dimethyl gluturate, dimethyl adipate, and dimethyl succinate; and
   1 to 3% by weight of tetrahydrofurfuryl alcohol.

* * * * *